US008223190B2

(12) United States Patent
Kim

(10) Patent No.: US 8,223,190 B2
(45) Date of Patent: Jul. 17, 2012

(54) DISPLAY APPARATUS AND CONTROL METHOD THEREOF

(75) Inventor: Byeong-Jin Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1064 days.

(21) Appl. No.: 12/141,389

(22) Filed: Jun. 18, 2008

(65) Prior Publication Data

US 2009/0122208 A1 May 14, 2009

(30) Foreign Application Priority Data

Nov. 14, 2007 (KR) ........................ 10-2007-0116233

(51) Int. Cl.
*H04N 7/14* (2006.01)

(52) U.S. Cl. .................................. 348/14.07; 348/14.01

(58) Field of Classification Search .... 348/14.01–14.03, 348/14.07, 14.08, 14.12–14.15, 552, 555, 348/563, 565; 379/93.17, 93.21, 93.23; 370/259, 370/260, 352
See application file for complete search history.

(56) References Cited

U.S. PATENT DOCUMENTS

2003/0169247 A1 9/2003 Kawabe et al.
2008/0036849 A1 * 2/2008 Oh et al. .................... 348/14.07

FOREIGN PATENT DOCUMENTS

EP 1213699 A2 6/2002
EP 1617712 A1 1/2006
JP 5-75949 A 3/1993
JP 2004-40698 A 2/2004
KR 1993-3759 A 2/1993
KR 2001-0085554 A 9/2001

* cited by examiner

*Primary Examiner* — Tuan Nguyen
(74) *Attorney, Agent, or Firm* — Sughrue Mion, PLLC

(57) ABSTRACT

A display apparatus includes: a main information receiver which receives main information; a video processor which processes a main video corresponding to the received main information; a display unit which displays the main video thereon; a sub information communicator which receives sub information comprising at least one of a video, an audio and text through Internet Protocol; and a controller which controls the video processor to process a sub video corresponding to the sub information received through the sub information communicator and display the sub video on the display unit.

19 Claims, 4 Drawing Sheets

DISPLAY APPARATUS AND CONTROL METHOD THEREOF

CROSS-REFERENCE TO RELATED APPLICATION

This application claims priority from Korean Patent Application No. 10-2007-0116233, filed on Nov. 14, 2007 in the Korean Intellectual Property Office, the disclosure of which is incorporated herein by reference.

BACKGROUND OF THE INVENTION

1. Field of the Invention

Apparatuses and methods consistent with the present general inventive concept relate to a display apparatus and a control method thereof, and more particularly, to a display apparatus which makes and receives calls through a network, and a control method thereof.

2. Description of the Related Art

A display apparatus receives a video signal from various sources such as a digital video disk (DVD) player, a video player, a satellite antenna and a cable. The display apparatus processes the received video signal to display a video thereon. The display apparatus includes an additional speaker to output an audio signal received together with the video signal, as an audio.

Voice over Internet Protocol (VoIP) uses a data communication packet network to make and receive calls. VoIP is a communication service which converts the voice into an internet protocol data packet to be transmitted, and makes and receives calls to telephones.

The conventional VoIP provides only voice transmission/reception. Meanwhile, there can be various means to make and receive calls. If the call is made with such various means, an additional device is required to output received call information.

Thus, it would be convenient if a user makes and receives a video call including a video and an audio, and uses text transmission/reception service as well as the voice transmission/reception through VoIP and if received call information is output to the display apparatus so that a user recognizes it.

SUMMARY OF THE INVENTION

Accordingly, the present invention provides a display apparatus in which a use makes and receives calls with various calling means including voice through VoIP, and a control method thereof.

The present invention also provides a display apparatus which outputs call information received through a VoIP, and a control method thereof.

The present invention also provides a display apparatus which enables a user to make and receive calls even if the call information is not output, and a control method thereof.

According to an aspect of the present invention, there is provided a display apparatus comprising: a main information receiver which receives main information; a video processor which processes a main video corresponding to the received main information; a display unit which displays the main video thereon; a sub information communicator which receives sub information comprising at least one of a video, an audio and a text through an internet protocol; and a controller which controls the video processor to process a sub video corresponding to the sub information received through the sub information communicator and display the sub video on the display unit.

The sub information communicator may receive the sub information via VOIP.

The controller may control the video processor to display the main video with the sub video.

The display apparatus may further comprise a sub information input unit to input the sub information, wherein the controller controls the sub information communicator to transmit the sub information input by the sub information input unit through the VOIP, and controls the video processor to process a sub video corresponding to the input sub information and display the sub video on the display unit.

The sub information input unit may comprise at least one of a camera, a microphone and a keyboard.

The display apparatus may further comprise: an audio processor which processes an audio; an audio output unit which outputs an audio processed by the audio processor, wherein the controller controls the audio processor to process a sub audio corresponding to the sub information received by the sub information communicator and output the sub audio through the audio output unit.

The audio processor may process a main audio corresponding to the main information, and the controller controls the audio processor to output the main audio through the audio output unit.

The controller may control the audio processor to output the main audio with the sub audio.

The controller may control the audio processor to adjust a volume level of at least one of the main audio and the sub audio.

The audio output unit may be provided plurally, and the controller controls the main audio to be output through at least one of the plurality of audio output units and controls the sub audio to be output through at least another of the remaining audio output units.

The display apparatus may further comprise a telephone which inputs and outputs an audio, wherein the controller transmits sub information received by the sub information communicator to the telephone and controls the sub information communicator to transmit the audio input by the telephone through the internet protocol.

The controller may transmit the sub information to the telephone if the sub information received by the sub information communicator is not displayable on the display unit.

According to another aspect of the present invention, there is provided a control method of a display apparatus, the control method comprising: displaying a main video corresponding to received main information; receiving sub information having at least one of a video, an audio and a text through an internet protocol; and displaying a sub video corresponding to the received sub information.

The receiving the sub information may comprise receiving the sub information via VOIP.

The displaying the main video may comprise displaying the main video with the sub video.

The displaying the sub video may comprise receiving sub information; transmitting the input sub information through the internet protocol; and displaying a sub video corresponding to the input sub information.

The receiving the sub information may comprise receiving the sub information through at least one of a camera, a microphone and a keyboard.

The displaying the main video may comprise outputting a main audio corresponding to the main information.

The displaying the sub video may comprise outputting a sub audio corresponding to sub information received through the internet protocol.

The outputting the sub audio may comprise outputting the sub audio with the main audio.

The outputting the sub audio may comprise adjusting a volume level of at least one of the main audio and the sub audio.

The receiving the sub information may comprise transmitting the sub information to a telephone if the sub information received through the internet protocol is not displayable on the display unit.

BRIEF DESCRIPTION OF THE DRAWINGS

The above and/or other aspects of the present general inventive concept will become apparent and more readily appreciated from the following description of exemplary embodiments, taken in conjunction with the accompanying drawings of which.

DETAILED DESCRIPTION OF EXEMPLARY EMBODIMENTS OF THE INVENTION

Hereinafter, exemplary embodiments of the present general inventive concept will be described with reference to accompanying drawings, wherein like numerals refer to like elements and repetitive descriptions will be avoided as necessary.

Figure 1:
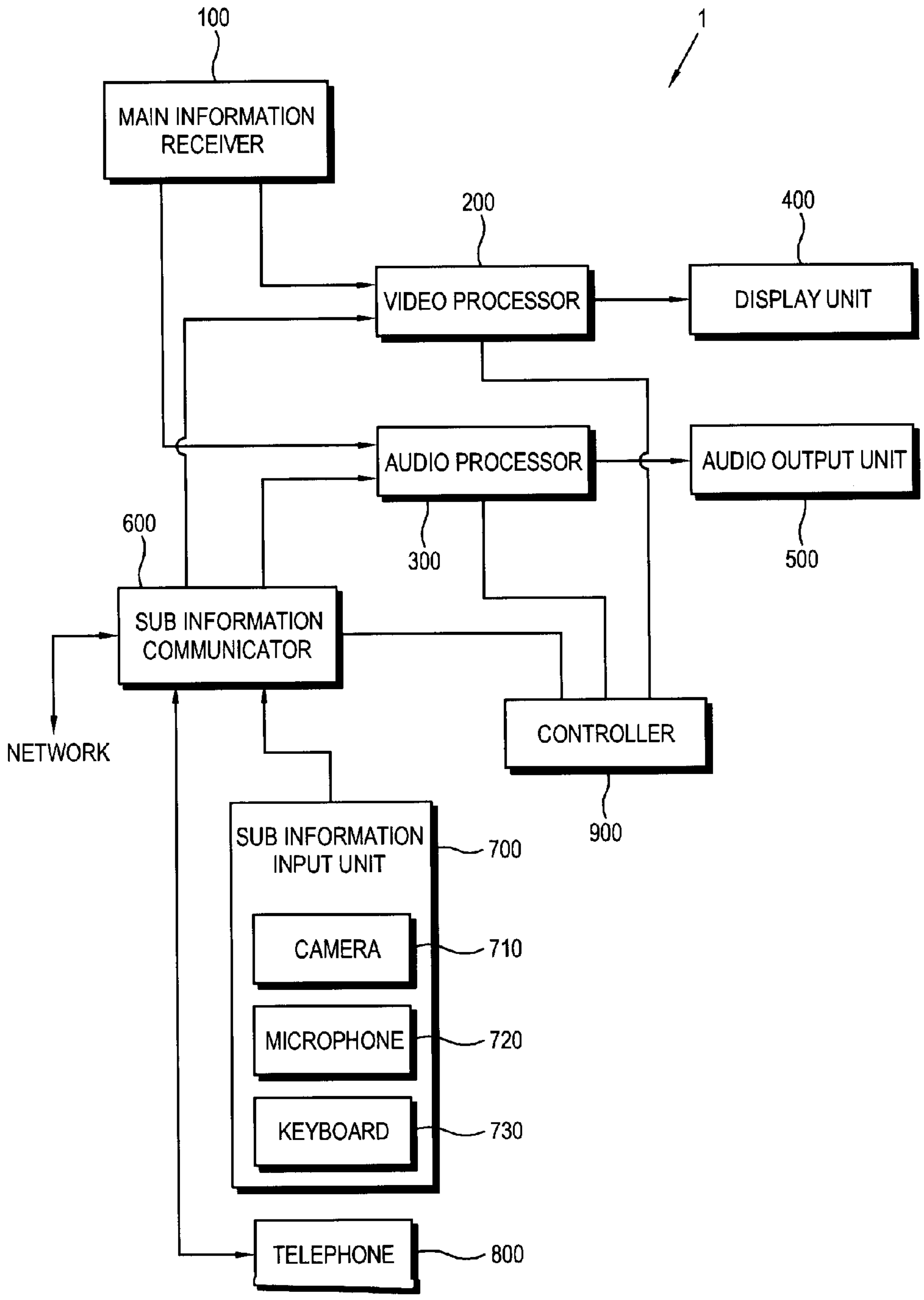
FIG. 1 is a block diagram of a display apparatus according to an exemplary embodiment of the present invention.

FIG. 1 illustrates a display apparatus 1 according to an exemplary embodiment of the present invention.

As shown therein, the display apparatus 1 according to the exemplary embodiment of the present general inventive concept provides a picture-in-picture (PIP) function which displays a plurality of videos on a main screen and a sub screen. The display apparatus 1 includes a main information receiver 100 that receives main information, a video processor 200 that processes a main video corresponding to the main information, a display unit 400 that displays the main video thereon, a sub information communicator 600 that receives sub information through a network and a controller 900 that controls the video processor 200 to process and display a sub video corresponding to the received sub information.

The display apparatus 1 further includes an audio processor 300 that processes an audio, an audio output unit 500 that outputs the processed audio, a sub information input unit 700 that inputs sub information and a telephone 800 to input and output an audio.

The main information receiver 100 receives the main information and transmits the main information to the video processor 200 and the audio processor 300. The main information may include various channels according to a frequency band, and a broadcasting signal including a video and an audio corresponding to each channel, but the present invention is not limited thereto. Alternatively, the main information may include a video signal transmitted by a computer (not shown). The main information according to the exemplary embodiment includes video information and audio information. The video and audio information are referred to as a main video and a main audio, respectively.

The main information receiver 100 has various configurations to receive the main information. For example, the main information receiver 100 may include an antenna (not shown) to wirelessly receive main information, may be connected to a cable (not shown) to receive main information from a broadcasting station or connected to a DVD player or a game console to receive main information therefrom. The main information receiver 100 may process the main information as main video information and main audio information to transmit the main video information and the main audio information to the video processor 200 and the audio processor 300, respectively.

The video processor 200 processes the main information received from the main information receiver 100 into the main video and displays the main video on the display unit 400. If sub information is transmitted from the sub information communicator 600, the video processor 200 processes the sub information into a sub video or a text depending on a property of the sub information and displays it on the display unit 400. The video processor 200 displays the sub video or the text together with the main video.

If the PIP function of the display unit 400 is turned on and the main video is already being displayed, the video processor 200 divides the screen of the display unit 400 into a main screen and a sub screen. The main screen includes an overall area of the screen of the display unit 400 while the sub screen includes a pop-up screen corresponding to a part of the main screen, but not limited thereto. The video processor 200 displays the main video on the main screen and displays the sub video on the sub screen.

If the received sub information includes text information, the video processor 200 may display the text information on the sub screen in a manner similar to that described above, or combine the text information with the main video to be overlaid in the main video.

The video processor 200 may include a video decoding function to decode the received information, a PIP function, a scaling function, a screen correction function, and other various functions.

The audio processor 300 processes the main information transmitted by the main information receiver 100 and the sub information transmitted by the sub information communicator 600 into a main audio and a sub audio according to a control of the controller 900, and outputs the processed main and sub audios to the audio output unit 500. If the sub audio is to be output while the main audio is already output through the audio output unit 500, the audio processor 300 outputs the main audio together with the sub audio to the audio output unit 500. The audio processor 300 may adjust the volume level of the main audio and the sub audio to relatively raise the volume of the desired audio.

The display unit 400 includes a liquid crystal display (LCD), a plasma display panel (PDP) or a cathode ray tube (CRT) to display the video processed by the video processor 200. The display unit 400 performs a PIP function, and divides a single screen into a plurality of screens to display different videos on the divided screens. Since the display unit 400 having the PIP function is known in the art, detailed description will be omitted.

The audio output unit 500 outputs an audio processed by the audio processor 300. The audio output unit 500 includes a plurality of speakers (not shown) in a plurality of channels. If a main audio and a sub audio are output together through the audio processor 300, the audio output unit 500 may simultaneously output the main and sub audios through a part of the speakers. That is, a single speaker (not shown) may overlap and output the main and sub audios, at least one of the plurality of speakers may output the main audio while at least another speaker of the remaining of the speakers may output the sub audio or the speaker may output the main audio and an additional headphone (not shown) may output the sub audio.

The sub information communicator 600 receives VoIP-based sub information through a network, more specifically through an Internet Protocol. The received sub information includes call information by VoIP. The call information may include one of audio information, video call information including a sub video and a sub audio, and text information. The sub information communicator 600 processes the received sub information. If the processed sub information includes a sub video or a text, the sub information communicator 600 transmits the sub information to the video processor 200. If the processed sub information includes a sub audio, the sub information communicator 600 transmits the sub information to the audio processor 300.

The sub information communicator 600 includes the sub information input unit 700 to input at least one of video, audio and text. Here, the VoIP-based sub information received through the Internet Protocol is called reception sub information, and sub information input by the sub information input unit 700 is called input sub information for convenience. The sub information communicator 600 separately processes the reception sub information and the input sub information.

More specifically, the sub information communicator 600 transmits the reception sub information to the video processor 200 and the audio processor 300 so that the reception sub information is displayed on the display unit 400 and output through the audio output unit 500. The sub information communicator 600 transmits the input sub information to the network. In this case, the sub information communicator 600 processes the input sub information based on the VoIP. Thus, the two-way call through the network may be available.

If the sub information input through the sub information input unit 700 includes text, a user may desire to check what he/she input. Thus, the sub information communicator 600 may preferably transmit the input sub information to the video processor 200 to be displayed on the display unit 400.

In summary, if the input sub information includes video and audio, the sub information communicator 600 processes the input sub information and transmits it to the network. If the input sub information includes text, the sub information communicator 600 processes the input sub information and transmits it to the video processor 200 as well as to the network. If the call is made and received through the text, a user's convenience may improve.

To support such function, the sub information communicator 600 may include VoIP-based encoder and decoder processing sub information, a network port (not shown) connected to the network and a local port (not shown) connected to the sub information input unit 700.

The sub information communicator 600 is connected to the telephone 800 which can input and output an audio. If the controller 900 determines that the display unit 400 may not display thereon the sub information received from the network through the VoIP, the sub information communicator 600 transmits the sub information to the telephone 800 to make and receive calls through the telephone 800. Here, the sub information communicator 600 transmits the audio information input by the telephone 800 to the network.

The sub information input unit 700 inputs sub information including video, audio and text and transmits them to the sub information communicator 600. The sub information input unit 700 includes a camera 710, a microphone 720 and/or a keyboard 730 to input the sub information, but not limited thereto.

With the foregoing configuration, the process of controlling the main information and the sub information by the controller 900 of the display apparatus 1 according to the exemplary embodiment will be described with reference to FIGS. 1 to 4. Here, the explanation considers the sub information in two cases, one for video call information including a sub video and a sub audio and the other one for the text information.

The control method of the display apparatus 1 according to the present general inventive concept includes a process of displaying a main video corresponding to the received main information, a process of receiving sub information including at least one of a video, an audio and a text by the VoIP and a process of displaying a sub video corresponding to the sub information.

The processes of displaying the main video and the sub video are performed at the same time. Each process includes a process of displaying a main audio corresponding to the main information and a process of displaying the sub audio corresponding to the sub information.

The process of receiving, displaying and outputting the main information will be described first with reference to FIG. 2.

Figure 2:
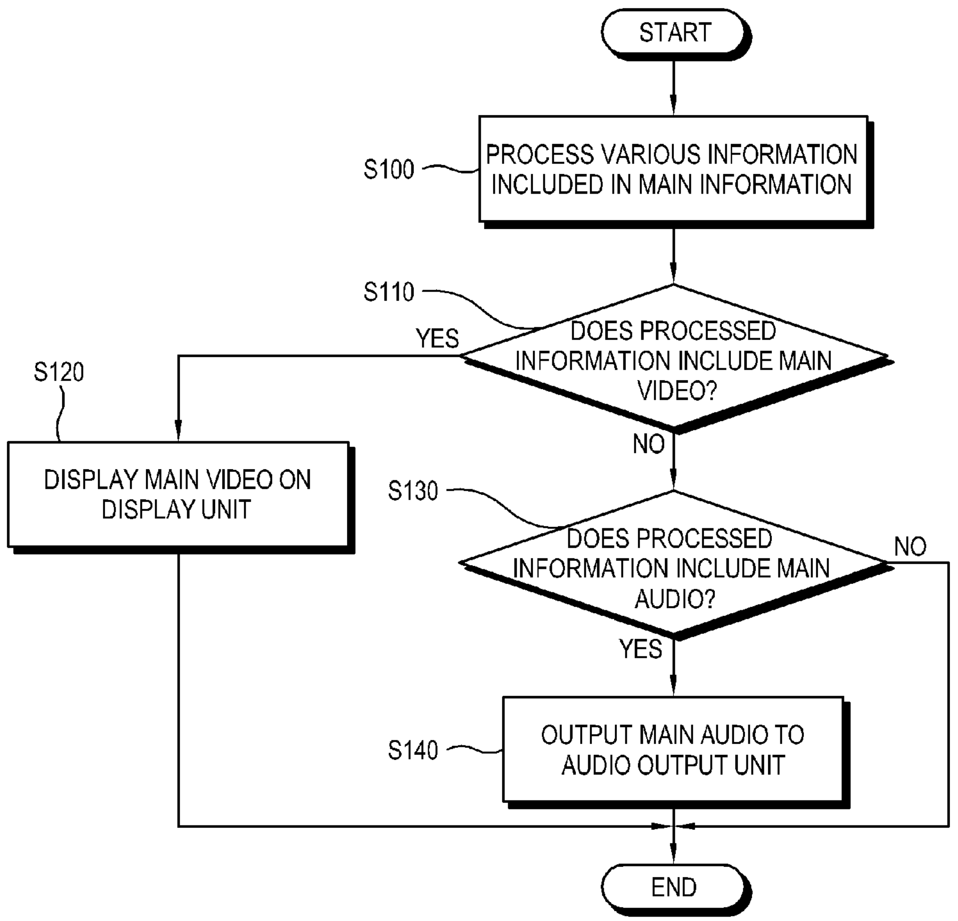
FIG. 2 is a flowchart illustrating a method of processing main information in the display apparatus in FIG. 1 according to an exemplary embodiment of the present invention.

As shown in FIGS. 1 and 2, if the main information is transmitted to the main information receiver 100, it is processed into the main video and the main audio (S100). The controller 900 determines whether the processed information includes the main video (S110). If the processed information includes the main video, the controller 900 controls the video processor 200 to process the main video and controls the display unit 400 to display the main video thereon (S120).

If the processed information does not include the main video, the controller 900 determines whether the processed information includes the main audio (S130). If the processed information includes the main audio, the controller 900 controls the audio processor 300 to process the main audio and controls the audio output unit 500 to output it (S140).

The foregoing processes are repeated to display and output the main video and the main audio to the display unit 400 and the audio output unit 500, respectively.

Based on the foregoing processes, the process of receiving and outputting the sub information will be described with reference to FIG. 3.

Figure 3:
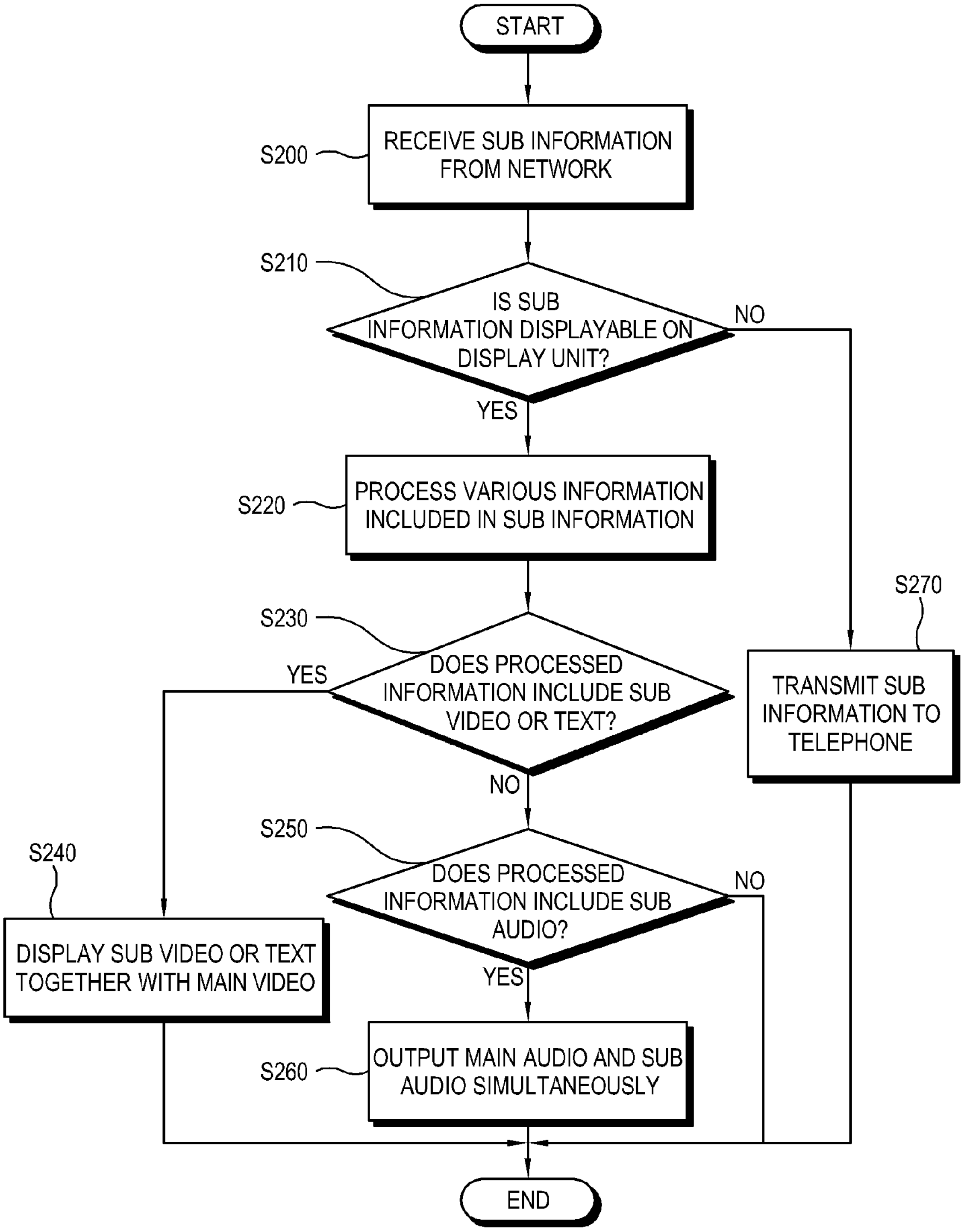
FIG. 3 is a flowchart illustrating a method of outputting sub information received through a VoIP from a network in the display apparatus in FIG. 2 according to an exemplary embodiment of the present invention.

As shown in FIGS. 1 and 3, if the VoIP-based sub information is transmitted from the network to the sub information communicator 600 (S200), the controller 900 determines whether the sub information is displayable on the display unit 400 (S210).

The sub information may not be displayable on the display unit 400 under some circumstances. For example, the sub information may not be displayable on the display unit 400 if power of the display unit 400 is not turned on, if the PIP function of the display unit 400 is not activated, etc.

If it is determined that the sub information is displayable on the display unit 400, the controller 900 controls to process various information included in the sub information (S220).

The controller 900 determines whether the processed sub information includes a sub video or text (S230). If the processed sub information includes the sub video or the text, the controller 900 transmits the sub information to the video processor 200. As the main video is being displayed on the display unit 400, the controller 900 controls the video processor 200 to process and display the sub video or the text together with the main video (S240).

If it is determined at operation S230 that the processed sub information does not include the sub video or the text, the controller 900 determines whether the sub information includes the sub audio (S250). If it is determined that the sub information includes the sub audio, the controller 900 transmits the sub information to the audio processor 300 so that the sub audio and the main audio are output simultaneously (S260).

If it is determined at operation S210 that the sub information received from the network is not displayable on the display unit 400, the controller 900 transmits the sub information received from the network to the telephone 800 (S270). Thus, a user may make or receive calls through the telephone 800, and the audio input through the telephone 800 is transmitted to the network by the sub information communicator 600.

Alternatively, the sub information received from the network may be output through the audio output unit 500. In this case, a user may input an audio through the microphone 720 to make and receive calls.

If the sub information includes the sub video and the sub audio in the display apparatus 1 according to the exemplary embodiment of the present general inventive concept, the sub information input by the sub information input unit 700 also includes the sub video and the sub audio corresponding thereto. The sub information communicator 600 transmits the input sub information to the network, and the sub information may not be output to the display unit 400 and the audio output unit 500. Alternatively, the video and audio included in the sub information input by the sub information input unit 700 may be output to the display unit 400 and the audio output unit 500, respectively.

If the input sub information includes text, the sub information needs to be displayed to be checked by a user. The process of inputting the text through the sub information input unit 700 will be described with reference to FIG. 4.

Figure 4:
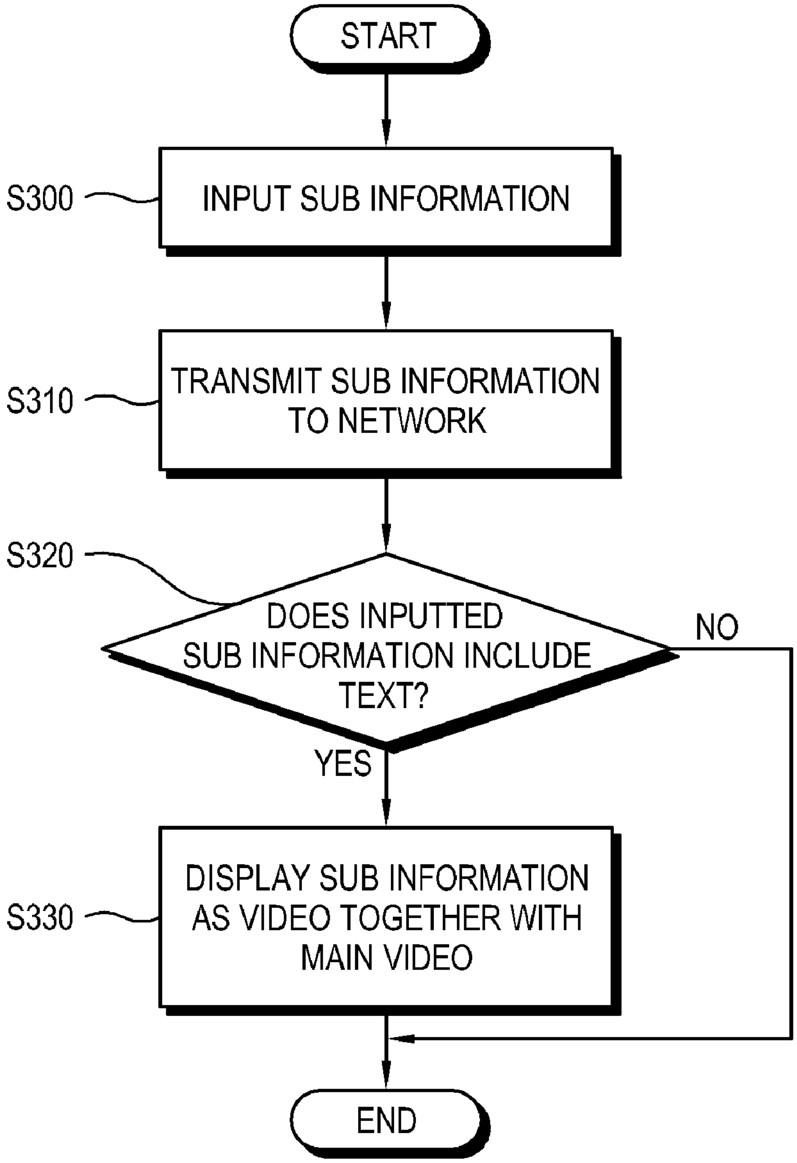
FIG. 4 is a flowchart illustrating a method of processing text information input to a sub information input unit of the display apparatus in FIG. 3 according to an exemplary embodiment of the present invention.

As shown in FIGS. 1 and 4, a user inputs the sub information through the sub information input unit 700 (S300). The controller 900 controls the sub information communicator 600 to process the input sub information based on the VoIP and transmit it to the network (S310). The controller 900 determines whether the sub information includes a text (S320).

If it is determined that the sub information includes the text, the controller 900 controls the video processor 200 to display the sub information as a video together with the main video (S330). Thus, a user may check what he/she input. The input text may be displayed by an on screen display (OSD) or a graphic user interface (GUI).

As described above, the display apparatus according to the present general inventive concept receives sub information such as a call signal to output a video, an audio or a text of the sub information together with a main video and a main audio and transmits information corresponding to the sub information to perform a two-way communication.

As described above, the present general inventive concept provides a display apparatus which includes a VoIP call function by using a video call and a text as well as an audio, and improves user's convenience.

Also, the present general inventive concept provides a display apparatus which mixes and outputs broadcasting video and audio and enables a user to make and receive calls while viewing TV broadcasting.

If call information may not be output by a display unit and an audio output unit, the call information is output through a telephone instead. Thus, a user may make and receive calls even if a TV is turned off.

Although a few exemplary embodiments of the present general inventive concept have been shown and described, it will be appreciated by those skilled in the art that changes may be made in these exemplary embodiments without departing from the principles and spirit of the invention, the scope of which is defined in the appended claims and their equivalents.

What is claimed is:

1. A display apparatus comprising:

a main information receiver which receives main information;

a sub information communicator which receives sub information comprising at least one of video, audio and text through Internet Protocol;

a video processor which processes a main video received by the main information receiver and a sub video received by the sub information communicator;

a display unit which displays the main video and the sub video processed by the video processor;

an audio processor which processes a main audio received by the main information receiver and a sub audio received by the sub information communicator;

an audio output unit which outputs the main audio and the sub audio processed by the audio processor; and a controller which controls the video processor and the display unit to display the sub video as a Picture In Picture (PIP) sub video of the main video, and controls the audio processor and the audio output unit to output the sub audio with the main audio simultaneously.

2. The display apparatus according to claim 1, wherein the sub information communicator receives the sub information via Voice Over Internet Protocol (VOIP).

3. The display apparatus according to claim 2, further comprising a sub information input unit through which the sub information is input, wherein the controller controls the sub information communicator to transmit the sub information input by the sub information input unit through the VOIP, and controls the video processor to process a sub video corresponding to the input sub information and display the sub video on the display unit.

4. The display apparatus according to claim 3, wherein the sub information input unit comprises at least one of a camera, a microphone and a keyboard.

5. The display apparatus according to claim 1, wherein the controller controls the video processor to display the main video with the sub video.

6. The display apparatus according to claim 1, wherein the audio processor processes a main audio corresponding to the main information, and the controller controls the audio processor to output the main audio through the audio output unit.

7. The display apparatus according to claim 6, wherein the controller controls the audio processor to output the main audio with the sub audio.

8. The display apparatus according to claim 7, wherein the controller controls the audio processor to adjust a volume level of at least one of the main audio and the sub audio.

9. The display apparatus according to claim 6, wherein the audio output unit comprises a plurality of audio output units, and the controller controls the main audio to be output through at least one of the plurality of audio output units and controls the sub audio to be output through at least another one of the plurality of audio output units.

10. The display apparatus according to claim 1, further comprising a telephone which inputs and outputs an audio, wherein the controller transmits sub information received by the sub information communicator to the telephone and controls the sub information communicator to transmit the audio input by the telephone through the internet protocol.

11. The display apparatus according to claim 10, wherein the controller transmits the sub information to the telephone if the sub information received by the sub information communicator is not displayable on the display unit.

12. A control method of a display apparatus, the control method comprising:

displaying a main video corresponding to main information which is received;

receiving sub information having at least one of a video, an audio and text through Internet Protocol; and displaying a sub video corresponding to the sub information which is received, wherein the displaying the main video comprises outputting a main audio corresponding to the main information, and wherein the displaying the sub video comprises outputting a sub audio corresponding to sub information received through the Internet Protocol.

13. The control method according to claim 12, wherein the receiving the sub information comprises receiving the sub information via Voice Over Internet Protocol (VOIP).

14. The control method according to claim 12, wherein the displaying the main video comprises displaying the main video with the sub video.

15. The control method according to claim 12, wherein the displaying the sub video comprises receiving sub information;

transmitting the input sub information through the Internet Protocol; and displaying a sub video corresponding to the input sub information.

16. The control method according to claim 15, wherein the receiving the sub information comprises receiving the sub information through at least one of a camera, a microphone and a keyboard.

17. The control method according to claim 12, wherein the outputting the sub audio comprises outputting the sub audio with the main audio.

18. The control method according to claim 17, wherein the outputting the sub audio comprises adjusting a volume level of at least one of the main audio and the sub audio.

19. The control method according to claim 12, wherein the receiving the sub information comprises transmitting the sub information to a telephone if the sub information received through the Internet Protocol is not displayable on the display unit.

* * * * *